United States Patent [19]
Ho

[11] Patent Number: 5,934,017
[45] Date of Patent: Aug. 10, 1999

[54] DESIGN OF PLANTER AND WATER RESERVOIR/LIQUID BOTTLE

[76] Inventor: I-Chung Ho, 6958 Grovespring Dr., Rancho Palos Verdes, Calif. 90275

[21] Appl. No.: 08/873,070

[22] Filed: Jun. 11, 1997

[51] Int. Cl.⁶ .......................... A01G 25/00; A01G 29/00; A01G 9/02
[52] U.S. Cl. .................. 47/79; 47/48.5; 47/66.6
[58] Field of Search ................. 47/48.5, 79, 82, 47/66.3, 66.6, 62 A, 76, 78, 66.5, 17, 60, 73; 119/72.5, 72, 77, 51.5

[56] References Cited

U.S. PATENT DOCUMENTS

| | | | |
|---|---|---|---|
| 129,451 | 7/1872 | Baldwin | 47/79 |
| 3,881,506 | 5/1975 | Hazen | 137/137 |
| 4,148,155 | 4/1979 | Allen | 47/59 |
| 4,346,532 | 8/1982 | Peterson | 47/66 |
| 4,349,864 | 9/1982 | Smith | 362/122 |
| 4,829,708 | 5/1989 | Gonzalez | 47/39 |
| 4,829,709 | 5/1989 | Centafanti | 47/79 |
| 4,864,771 | 9/1989 | Fah | 47/79 |
| 4,896,457 | 1/1990 | Pitcher | 47/82 |
| 5,044,120 | 9/1991 | Couch | 47/79 |
| 5,180,552 | 1/1993 | Saceman | 422/1 |
| 5,201,860 | 4/1993 | Richardson | 47/39 |
| 5,217,696 | 6/1993 | Wolverton et al. | 422/121 |
| 5,241,784 | 9/1993 | Henry | 47/66 |
| 5,277,877 | 1/1994 | Jeffrey et al. | 422/124 |
| 5,430,972 | 7/1995 | Wianecki | 47/66 |
| 5,433,923 | 7/1995 | Wolverton et al. | 422/121 |
| 5,454,187 | 10/1995 | Wasserman | 47/39 |
| 5,638,638 | 6/1997 | Moskowitz | 47/71 |
| 5,669,329 | 9/1997 | Krause | 119/72.5 |

FOREIGN PATENT DOCUMENTS

| | | | |
|---|---|---|---|
| 1156464 | 11/1983 | Canada | 47/79 V |
| 195542 | 9/1986 | European Pat. Off. | 47/79 V |
| 661013 | 7/1929 | France | 47/79 N |
| 1473290 | 3/1967 | France | 47/79 V |
| 2305123 | 10/1976 | France | 47/79 I |
| 864469 | 1/1953 | Germany | 47/79 N |
| 3418266 | 12/1985 | Germany | 47/79 V |
| 2218609 | 11/1989 | United Kingdom | 47/79 V |
| 2250171 | 6/1992 | United Kingdom | 47/79 V |

*Primary Examiner*—Thomas Price
*Assistant Examiner*—Fredrick T. French, III

[57] ABSTRACT

An improved planter with optional inserts for growing house plants in potting soil or hydroponically in pebbles or other potting medium for the purpose of improving the characteristics of purifying ambient air quality and reducing the work of maintaining the plants. A removable see through water reservoir/liquid bottle is attached to the planter such that the water level in the planter is maintained constant at all times. The watering frequency is reduced because of the large water reservoir/liquid bottle. Three different types of inserts may be added to the planter to further enhance the effectiveness of air purification by the plants. A simple insert used to increase the interface areas of ambient air with the potting medium and the root system. The second insert includes a circulation fan to increase the circulation of air through the potting medium and the root system. The third insert includes a lamp with or without a circulation fan. The addition of a lamp will help to sterilize the air. Another advantage of this improved planter is that water at the bottom of the planter does not in direct contact with the ambient air thus greatly reduced or eliminated the growth of mildew or microbes which is a common problem in existing self watering planters on the market.

The non-spill liquid bottle can be partially turned over after refill will not spill its content. This design makes pouring liquid from a bottle much less likely to spill. Therefore, the application of this type of liquid bottle can be found in many applications where spillage is a concern. Examples of its usage include water bottle for bottled water drinking fountain, motor oil, anti-freeze fluid, cooking oil, etc.

11 Claims, 6 Drawing Sheets

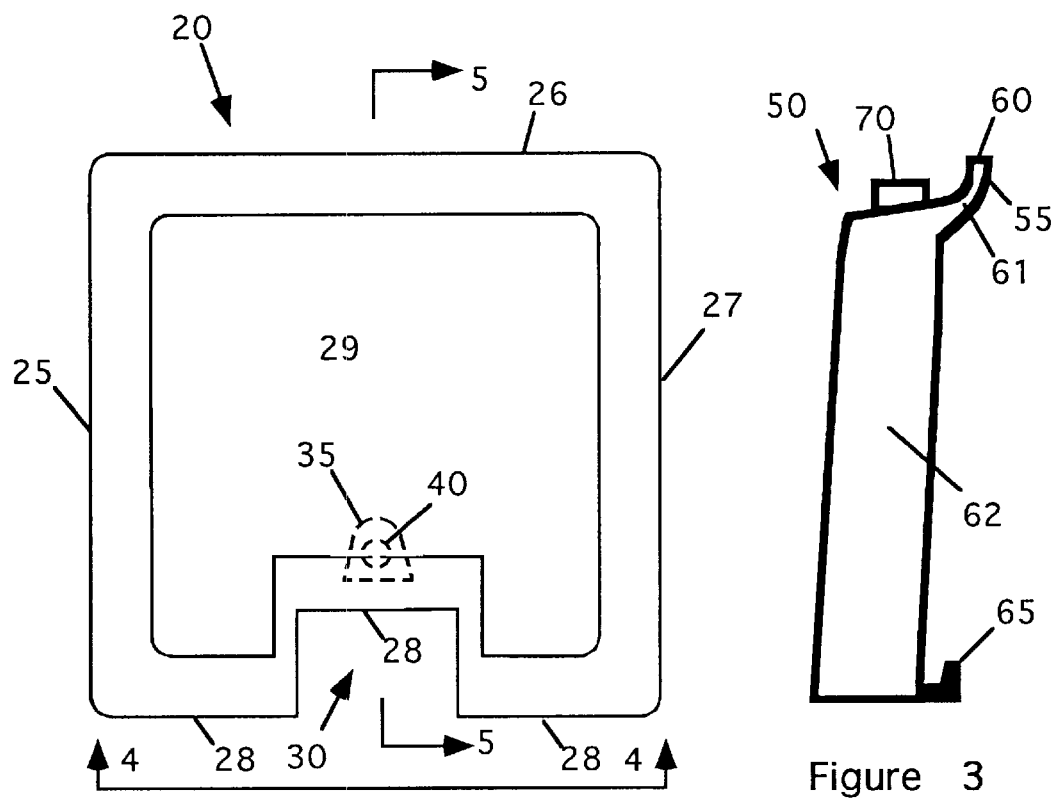
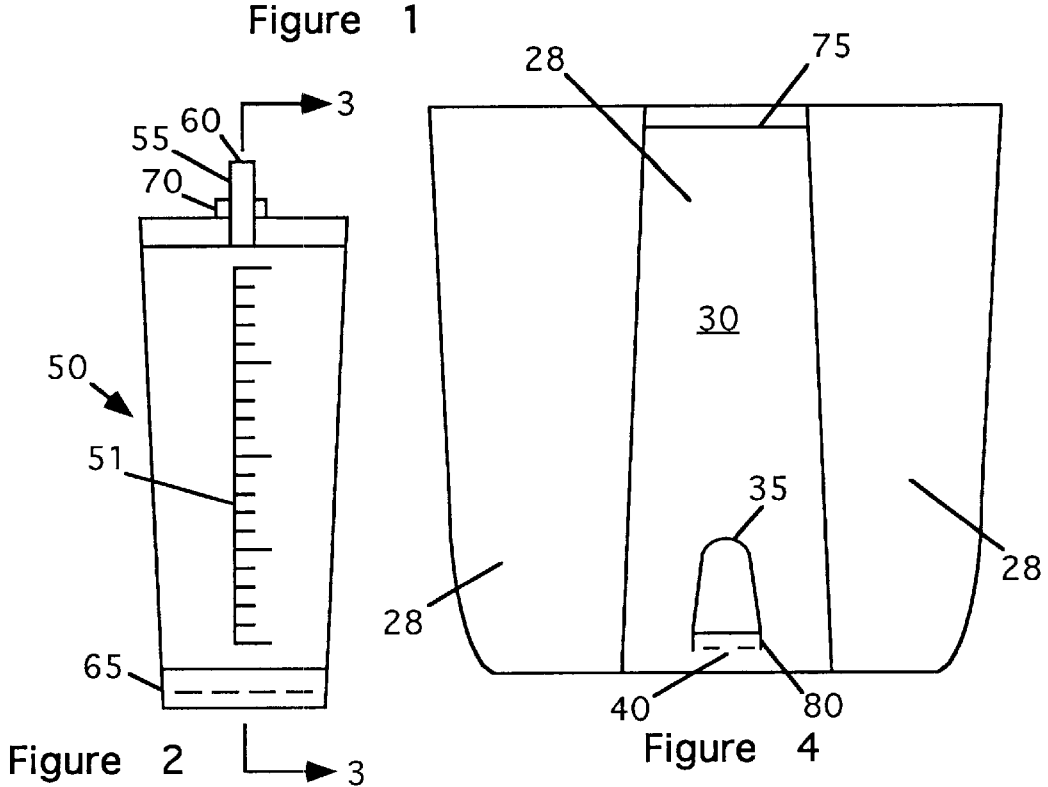

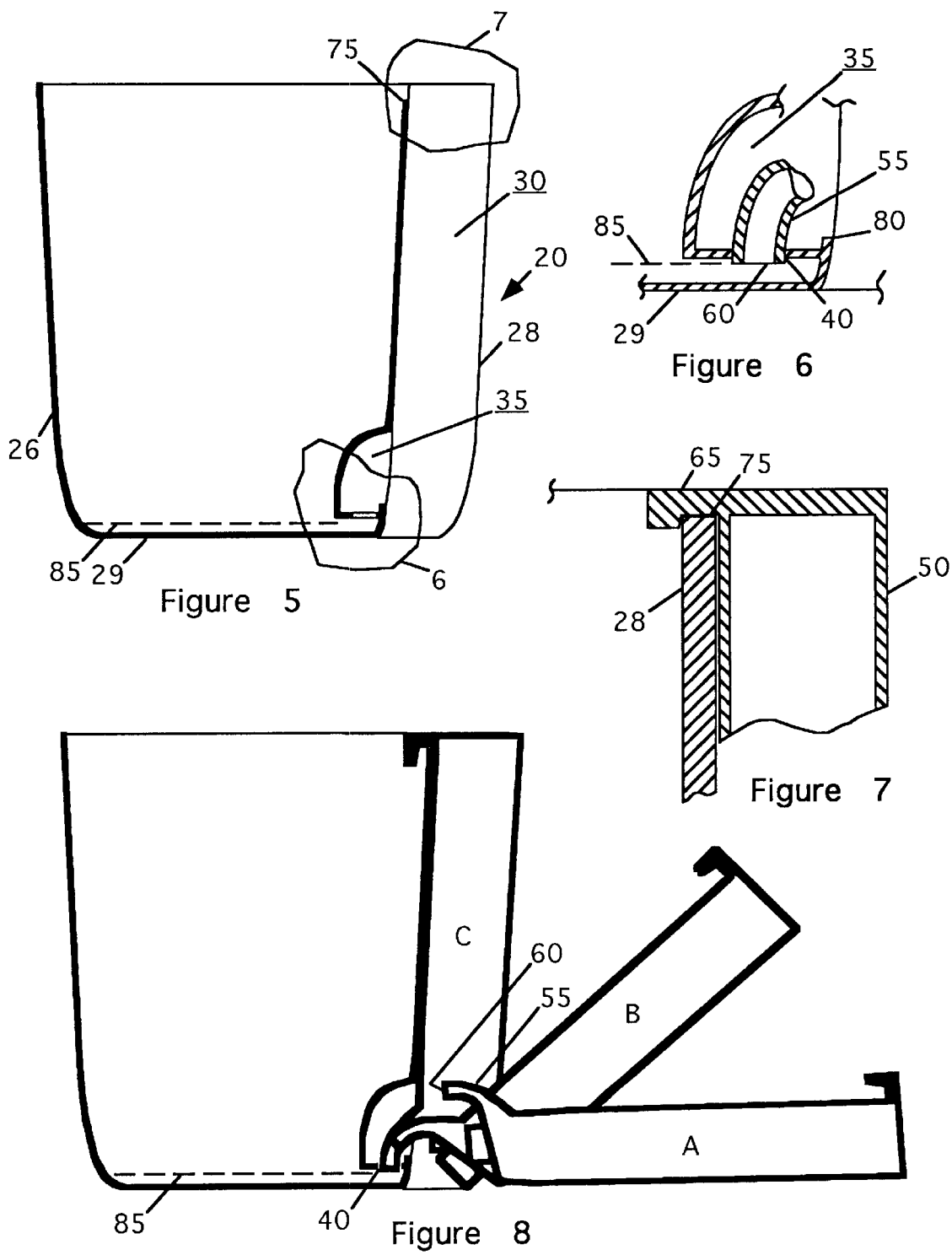

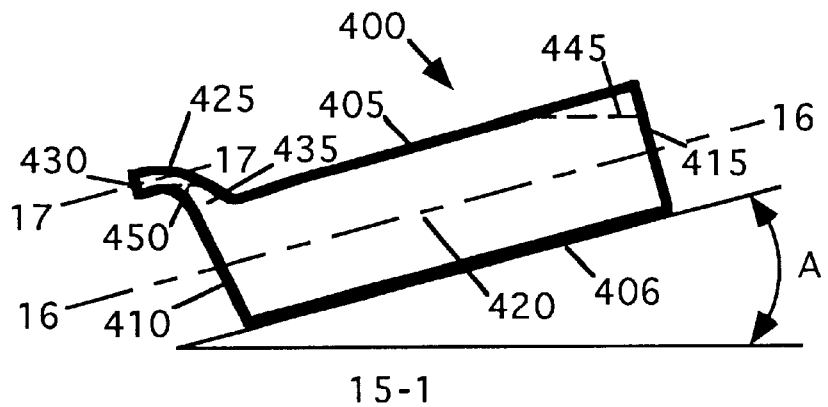
15-1
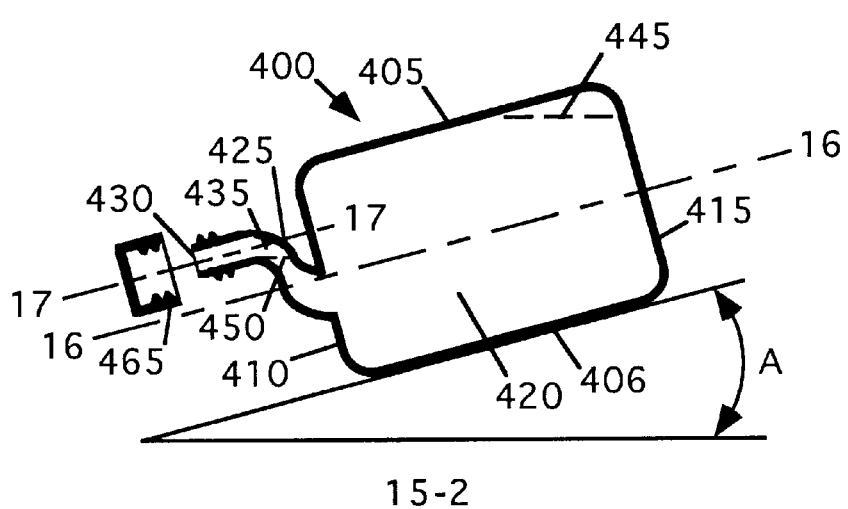
15-2
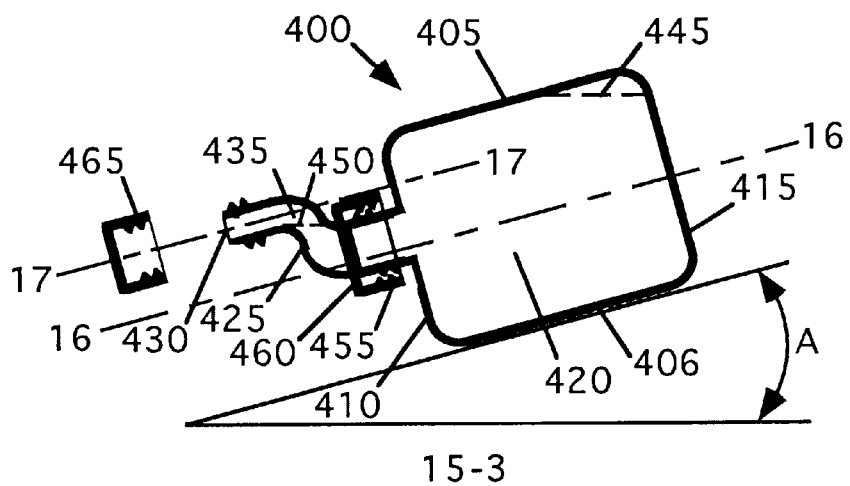
15-3
Figure 15

DESIGN OF PLANTER AND WATER RESERVOIR/LIQUID BOTTLE

BACKGROUND OF THE INVENTION

It is well known that plants need air, water, and light for growth. It is also known that plants purify air. The purification of air through plant leaves are well known. However, the role of complex biological and bacterial process of plant's root system in breaking down air polluting chemicals and suppress the growth of microbes was only became understood in recent years.

Since the energy crisis in the 70's, new homes are being built with energy efficiency in mind. To achieve this, buildings are tend to have less air circulation with the outside air and better seal around doors and windows. The result of these changes in addition to the wide spread use of plastics, paints and other synthetic materials and chemicals, the indoor air pollution have become a serious health problem. Which resulted in the so called sick air syndrome. Several air purification planters and apparatus were proposed by U.S. patents such as U.S. Pat. Nos. 5,217,696; 5,269,094; 5,351,438; and 5,433,923. These patents suggest means to improve the interaction of air with the root system of the plants. Major deficit of these designs include 1) lack of sufficient water reservoir in the planter which increases the work of maintaining the plants, 2) relatively large variation of water level within the planter which is, in many respect, an undesirable consequence of being unable to control a constant water level in the planter.

On the market everywhere, there are many kinds of the so called "self watering" planters available to the public. There are very little difference among these planters. The basic feature of these "self watering" planters is that a small water reservoir at the bottom of the planter with a water filling opening near the bottom of the planter side wall. Perforated divider separates soil with water reservoir except that there are few studs or channels in the divider which extend down into the water reservoir and all the way to the bottom of the planter so that soil in these studs or channels were able to be submerged in the water at any given water level in the water reservoir. Capillary action of the soil were able to lift water to the root system and support plant growth. The disadvantages of these "self watering" planters include 1) the size of the water reservoir is usually small and the uncontrollable water level also change with time, 2) the bottom exposed portion of the soil and the water reservoir are directly open to the ambient air through the water refill opening and thus mildew or microbes growth is a common problem.

This invention relates to a planter with a removable water reservoir/liquid bottle which is capable of maintaining a constant water level in the planter. Because the water reservoir/liquid bottle is exterior to the planter and removable for refill, the size of the water reservoir/liquid bottle may be made as big as one wishes. The neck of the water reservoir/liquid bottle mouth "plugs" into the opening of the planter thus minimized the direct contact of water and potting medium in the container with the ambient air and thus reduced or eliminated the problem of mildew around water in the planter.

With different inserts, the interface areas of ambient air with the potting medium and the root system is maximized, thus enhances the effectiveness of air purification process by the root system. Lamp and circulation fan are also provided. The location of the fan is imbedded within the potting medium and the water in the planter thus greatly reduced the vibration and noise level of the fan.

When inserting a full bottle of water to a drinking fountain stand, pour a can of motor oil to the engine, pour anti-freeze liquid to the radiator and in many other occasions, the liquid in the bottle is often too full and the receptacle spot is having too small of an opening. Under these circumstances, one must act quickly or very often spill the liquid all over the place. The extended curved neck of the liquid bottle of this invention allows the bottle to be laid flat without spilling. The extended curved neck design even allows the user to raise the bottom of the bottle such that the liquid level inside the liquid bottle is higher than its mouth opening without spilling. This special feature makes the insertion and removal of water bottle from a drinking fountain extremely easy. In fact, this design simply makes the pouring of liquid from a container much more manageable with less chance of spilling.

SUMMARY OF THE INVENTION

It is an object of the present invention to provide an improved planter for plants.

It is another object of the present invention to provide a removable and refillable water reservoir/liquid bottle for the planter. The removable water reservoir/liquid bottle is made of transparent material or with a strip of see through window so that the water level in the water reservoir/liquid bottle is clear view.

It is another object of the present invention to provide and maintain a constant water level in the planter.

It is another object of the present invention to increase the interface surface areas between ambient air with the potting medium and the root system. The improved air circulation and the inclusion of a lamp are all means of improving the effectiveness of air purification and sterilization.

It is yet another object of the present invention to provide an improved water reservoir/liquid bottle such that it is easier to turn over for insert to the planter, water fountain or other applications or just for pouring of liquid without the concern of spilling.

The present invention includes an improved planter with a small opening at near the bottom of the planter. A water reservoir/liquid bottle with an extended curved neck can be "plugged" into the opening of the planter and minimized the direct contact of water and potting medium in the planter with the ambient air. A constant level of water is maintained inside the planter. This constant water level is achieved by the upside down water reservoir/liquid bottle and the partial vacuum created within the water reservoir/liquid bottle.

Three different version of inserts can be placed inside the planter. Each one serves different purposes and with different complexity. The simplest insert will help to increase the interface areas of ambient air with the potting medium and the root system thus improves the breathing or circulation of air in the root system and enhance the air purification process by the root system. The second insert includes a circulation fan such that the circulation of air is greatly increased. The third insert includes a lamp with or without a circulation fan. The lamp using either incandescent bulb or bulb with ultra violet feature will help to disinfect the air being circulated around the bulb. The inclusion of a fan will further enhance the air circulation.

For air purification purpose, hydroponically soil-less planting is the desirable approach. Water absorbing pebbles such as expended clay and zeolite with or without activated carbon are ideal potting medium. This type of potting medium often leave many void air spaces in the potting medium and the root system and allows circulating air to be scrubbed by the wet pebble surfaces and the root system and maximizing the effect of air purification.

Conventional potting soil may also be used in this planter. The air purification property does reduced considerably, nevertheless, it is still better than the regular planter. Other advantages of the planter described earlier still apply.

The extended curved neck design of the water reservoir/liquid bottle provides a unique feature which allows the water reservoir/liquid bottle to be laid flat after filling without spilling any liquid. In fact, the bottom of the water reservoir/liquid bottle can be lifted even higher with the liquid line inside being higher than the opening of the water reservoir/liquid bottle without spilling any liquid. Bottle design with this feature could be applied to, in addition to the disclosed planter as described in this application, bottled water for drinking fountain, motor oil bottle, anti-freeze fluid bottle, cooking oil bottle and many other applications whenever spillage is a concern when the bottle is turned for pouring.

BRIEF DESCRIPTION OF THE DRAWINGS

FIG. 1 is a top view of the planter of the present invention.

FIG. 2 is a top view of the removable water reservoir/liquid bottle of the present invention being laid flat.

FIG. 3 is the cross-sectional view of FIG. 2 along line 3—3.

FIG. 4 is the side view of FIG. 1 in the direction along line 4—4.

FIG. 5 is the cross-sectional view of FIG. 1 along line 5—5.

FIG. 6 is the detailed view of the portion indicated in zone 6 of FIG. 5.

FIG. 7 is the detailed view of the portion indicated in zone 7 of FIG. 5 with the water reservoir/liquid bottle (partially shown) hung on the side wall of the planter.

FIG. 8 shows the same cross-sectional view of FIG. 5 with water reservoir/liquid bottle inserting to the opening of the planter in three progressive positions.

FIG. 15-1, 15-2 and 15-3 shows examples of liquid bottle designs with the extended curved neck feature presented in this disclosure which may be used as a refillable water bottle or for many other applications.

DETAILED DESCRIPTION OF THE INVENTION

Figures 9, 10:
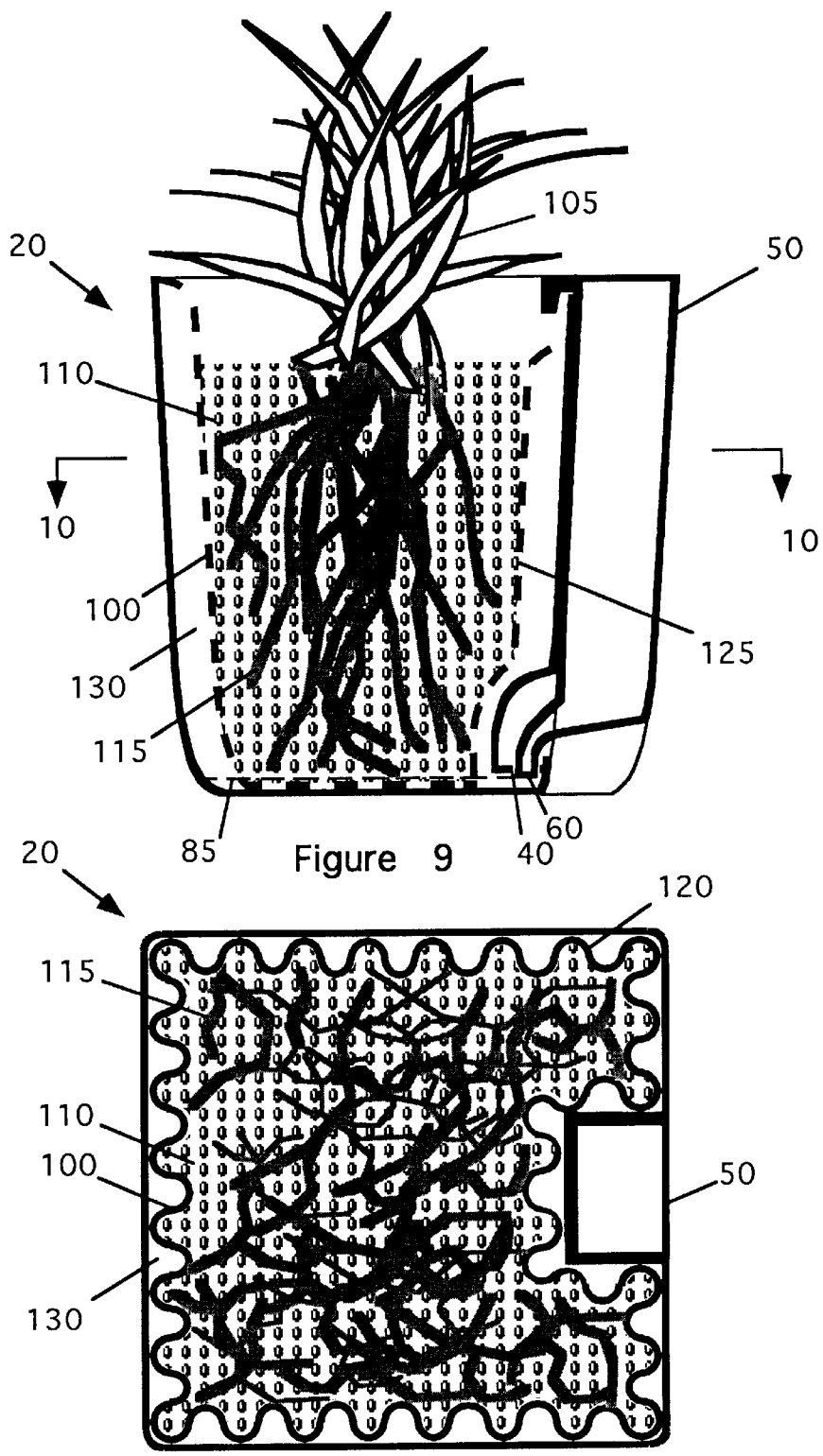
FIG. 9 shows the same cross-sectional view of FIG. 5 with the first insert and water reservoir/liquid bottle hung in place and plant potted with potting medium.
FIG. 10 shows the cross-sectional view of FIG. 9 along line 10—10.

FIG. 1 shows the top view of the planter 20 of the present invention. Which has four side walls 25, 26, 27, and 28 and a bottom 29. The rectangular shaped planter shown is for example only, many other shapes may also be suitable. One of the side wall 28 has an indentation 30. Near the bottom of the planter at the indentation 30, the side wall 28 has a further cavity 35 (may be seen better in FIGS. 4 and 5 and is partially detailed in FIG. 6). There is an opening 40 at the bottom of the cavity 35. A water reservoir/liquid bottle 50 shown in FIGS. 2 and 3 is shaped to match the indentation 30. FIG. 2 shows the top view of the water reservoir/liquid bottle 50 which is being laid flat. The water reservoir/liquid bottle 50 is made of transparent material or at least a portion of the side wall (the bottom wall as shown in FIG. 2) is transparent and is marked with a scale 51. The amount of water remaining in the water reservoir/liquid bottle 50 will be clearly visible while inserted to the planter.

FIG. 3 is the cross-sectional view of the water reservoir/liquid bottle 50 along line 3—3 in FIG. 2. The heavy bold lines shown in FIG. 3 as well as other figures described later represent the thickness of the cross-sectional walls. The water reservoir/liquid bottle 50 has an extended curved neck 55 and a mouth opening 60. A passage way 61 connects the mouth opening to the storage chamber 62 where water is stored. It also has a hanging hook 65, and a refill opening with a cap 70. FIG. 4 is the side view of the planter 20 along line 4—4 in FIG. 1. The indented portion of the side wall 28 has lower side wall at edge 75 where the hanging hook 65 of the water reservoir/liquid bottle 50 will hang. The cavity 35 allows the opening 40 to be further set back into the planter (better seen in FIGS. 5 and 6). This arrangement plus all the side walls of the planter being tilted inward with the bottom of the planter being smaller than the top so that the stacking of planters to save space for shipping and storage becomes possible. A raised edge 80 surround the opening 40 will catch any water spill during the insertion or removal of the water reservoir/liquid bottle 50. FIG. 5 shows the cross-sectional view of the planter along line 5—5 in FIG. 1. A detailed cross-sectional view for the portion of region 6 is shown in FIG. 6. FIG. 6 includes a section of the extended curved neck 55 of the water reservoir/liquid bottle 50. FIG. 7 is a detailed partial cross-sectional view of the region 7 shown in FIG. 5 with the water reservoir/liquid bottle 50 (only a small portion is shown) already hung on side wall 28 at the lowered edge 75. FIG. 8 is the same cross-sectional view of FIG. 5 showing how the water reservoir/liquid bottle 50 is inserted into the planter 20 with the water reservoir/liquid bottle shown in three progressive positions. When the water reservoir/liquid bottle 50 is filled and the refill cap 70 closed tight, the water reservoir/liquid bottle may be laid flat in position A. The specially designed extended curved neck 55 allows the water reservoir/liquid bottle to be laid flat without spilling any water. In fact, the water reservoir/liquid bottle could be lifted to an angle well beyond position B as shown in FIG. 8 before water will start to flow out. The extended curved neck 55 also allows the mouth opening 60 to be aimed toward the cavity 35 at the opening 40 easy. The insertion of water reservoir/liquid bottle 50 into the planter 20 from position A through position B to the final hung position C becomes easy and less likely that any water will spill outside the planter. Due to a partial vacuum created within the water reservoir/liquid bottle 50, the water level line 85 in the planter will be automatically maintained at the mouth opening 60 of the water reservoir/liquid bottle 50 for as long as there is water remaining in the water reservoir/liquid bottle. The indentation 30 shown in the figures and described in this disclosure is not a necessary feature. The inclusion of this indentation is for better visual appearance of the planter. After the water reservoir/liquid bottle is filled with water and hung to the planter, the water reservoir/liquid bottle fits well with the indentation and the planter appeared square again on the outside. If the planter is rectangular in shape, the water reservoir/liquid bottle may very well to have the same width of the planter without indentation and still have a pleasant appearance.

FIG. 9 shows the same cross-sectional view of FIG. 5 along line 5—5 in FIG. 1 with water reservoir/liquid bottle 50 inserted. FIG. 9 also shows the first insert 100 along with plant 105 potted using potting medium 110. FIG. 10 shows the cross-sectional view along line 10—10 in FIG. 9. The purpose of this insert 100 is to provide a maximized interface areas of ambient air with the potting medium 110 and the root system 115 of the plant 105. It is achieved by utilizing any suitable forms of wavy side walls 120 of the insert 100 against the inside surfaces of the planter side walls such that narrow air passage ways 130 are formed. The wavy side walls have small holes or perforations 125 (shown in FIG. 9). These holes allow the breathing of the root system with ambient air in the air passage ways 130. Potting medium 110 fill the insert where the plant 105 is potted. The bottom layers of the potting medium submerged under the water level line 85. Capillary action along with the suction of the root system 115 carry water to the upper portion of the potting medium and therefore support the plant growth. The tip of the extended curved neck 55 of the water reservoir/ liquid bottle 50 closes off the opening 40 in the planter and isolates ambient air from direct contact with the water in the planter. Any contact of air must pass through the potting medium and the root system or through the narrow air passage ways 130. The ability of the root system in suppressing microbe growth in the vicinity of the root system including the air passage ways 130 will help reduce or eliminate mildew growth near the water line 85. Which has always been a major problem in the ordinary "self watering" planter. The biological and bacterial process of the root system along with the increased interface areas with ambient air will greatly enhance the air purification process compare to the same plant growing in an ordinary planter.

Figure 11:
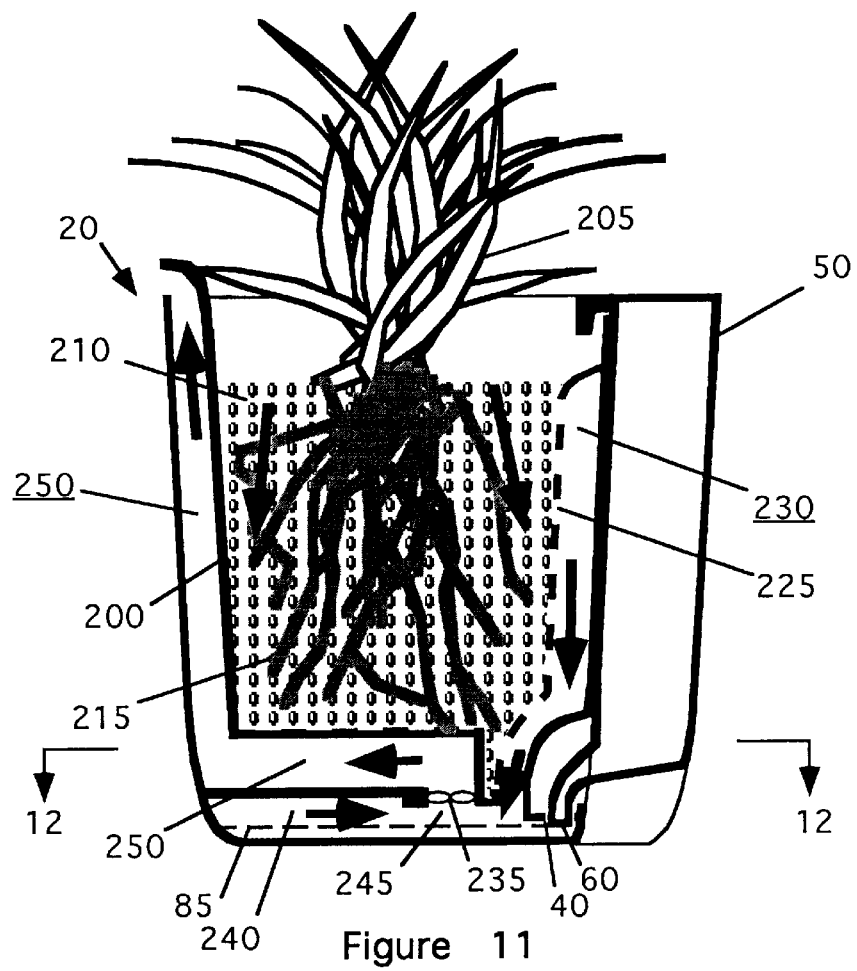
FIG. 11 shows the same cross-sectional view of FIG. 5 with the second insert (including fan) and water reservoir/liquid bottle hung in place and plant potted with potting medium.
Figure 12:
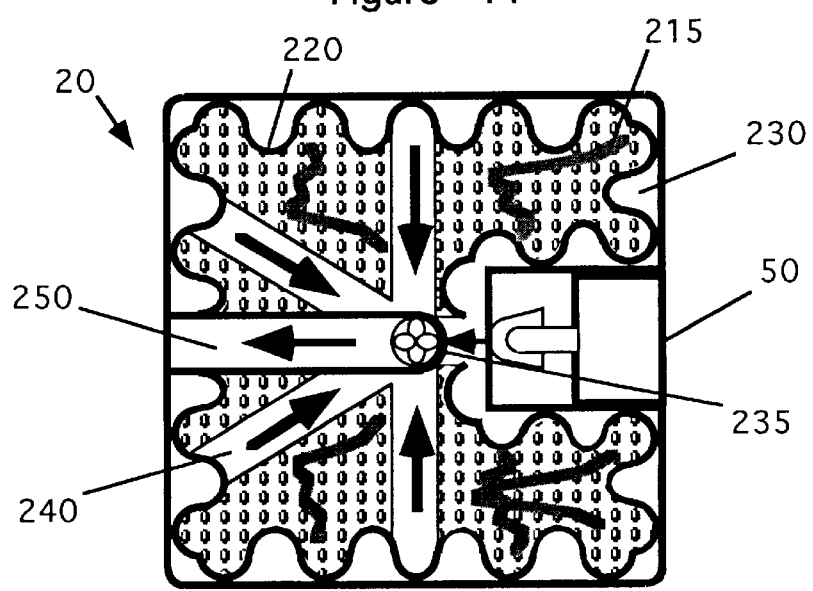
FIG. 12 shows the cross-sectional view of FIG. 11 along line 12—12.

FIG. 11 shows the same cross-sectional view of FIG. 5 along line 5—5 in FIG. 1 with water reservoir/liquid bottle 50 inserted. FIG. 11 also shows the second insert 200 along with plant 205 potted using potting medium 210. FIG. 12 shows the cross-sectional view along line 12—12 in FIG. 11. The purpose of this insert 200 is the inclusion of a circulation fan 235 to enhance the air flow in addition to maximize the interface areas of ambient air with the potting medium 210 and the root system 215 of the plant 205. The wavy side walls 220 of the insert 200 against the inside surfaces of the planter side walls formed narrow air passage ways 230. The wavy side walls 220 have small holes or perforations 225 for air to pass through. A circulation fan 235 is located at the bottom center of the insert 200 slightly above the water level line 85. The use of circulation fan helps to increase air flow through the potting medium and the root system. The circulating air is than passed through the small holes or perforation 225 of the insert and down through the air passage ways 230 to the bottom of the planter. Partition walls at the bottom of the insert forms air inlet ducting 240, which guide the circulation air toward the suction side 245 of the fan 235. Discharge duct 250 guides the exhaust air to the ambient. Potting medium 210 fill the insert where the plant 205 is potted. The bottom layers of the potting medium submerged under the water level line 85. Capillary action along with the suction of the root system 215 carry water to the upper portion of the potting medium and therefore support the plant growth.

Figure 13:
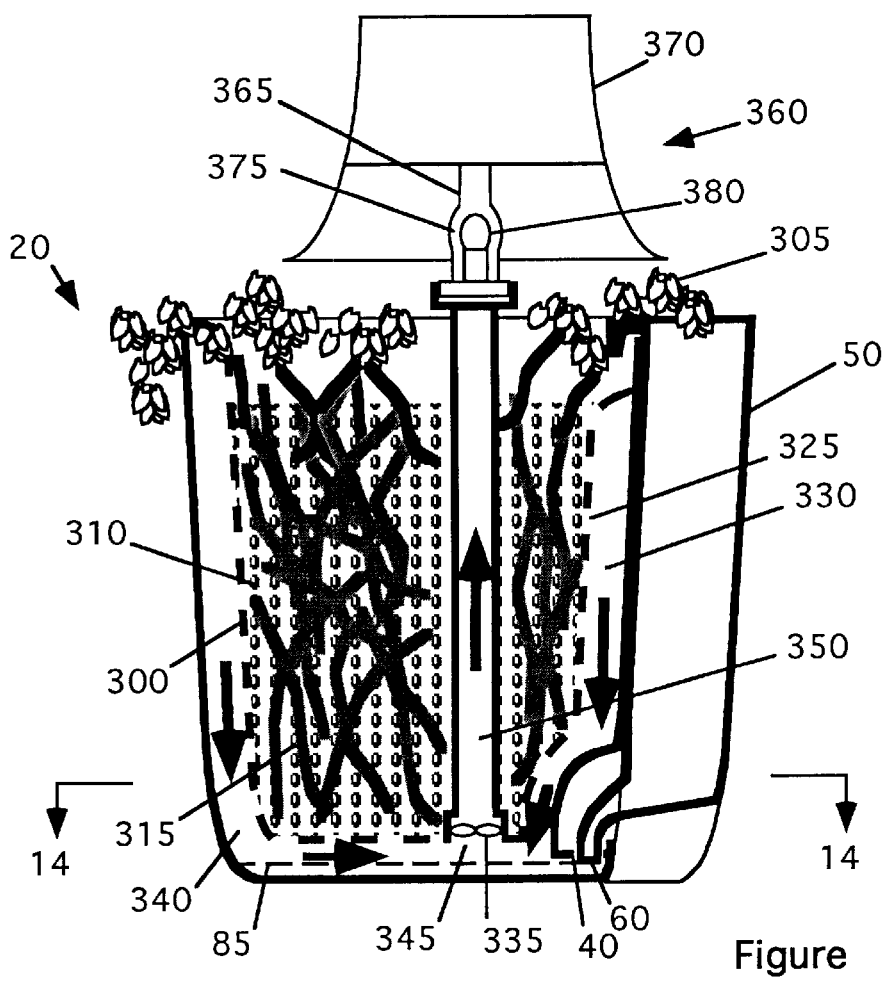
FIG. 13 shows the same cross-sectional view of FIG. 5 with the third insert (including lamp and fan) and water reservoir/liquid bottle hung in place and plant potted with potting medium.
Figure 14:
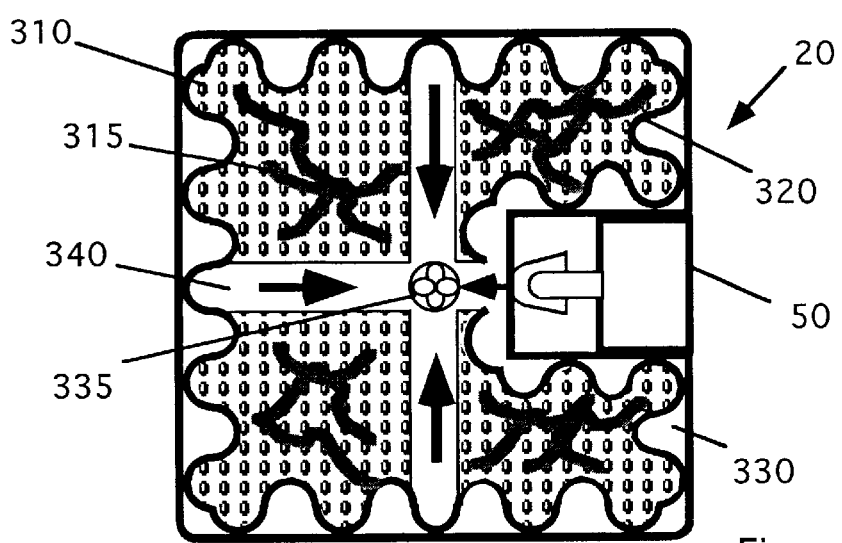
FIG. 14 shows the cross-sectional view of FIG. 13 along line 14—14.

FIG. 13 shows the same cross-sectional view of FIG. 5 along line 5—5 in FIG. 1 with water reservoir/liquid bottle 50 inserted. FIG. 13 also shows the third insert 300 along with plants 305 potted using potting medium 310. FIG. 14 shows the cross-sectional view along line 14—14 in FIG. 13. The purpose of this insert 300 is to include a lamp 360 to the discharge duct 350 along with a glass shield 365 and a lamp shade 370 in addition to maximize the interface areas of ambient air with the potting medium 310 and the root system 315 of the plants 305. The wavy side walls 320 of the insert 300 against the inside surfaces of the planter side walls formed narrow air passage ways 330. The heat of the lamp will heat the air and cause the air to rise and pass through the air gap 375 between light bulb 380 and the glass shield 365. This rise of air creates a suction at the discharge duct 350 which in turn pulls ambient air to pass through potting medium 310 and the root system 315 than through holes or perforation 325 and down the air passage ways 330, the air inlet ducting 340 to the discharge duct 350. Circulation fan 335 located at the bottom of the discharge duct 350 and above the water level line 85. Some enhancement of air circulation by fan is helpful but too much air flow may cause the light bulb 380 being unable to heat the air hot enough for sterilization. Potting medium 310 fills the insert where the plant is potted. The bottom layers of the potting medium submerged under the water level line 85. Capillary action along with the suction of the root system 315 carry water to the upper portion of the potting medium and therefore support the plant growth.

FIG. 15 shows examples of various versions of liquid bottle 400 with the extended curved neck feature incorporated into the design. The liquid bottle 400 may be of any shapes or sizes. It generally has side walls 405, top wall 410, and bottom wall 415. If desirable, one of the side wall 406 may be flat to allow the liquid bottle to lay flat after filling. A major axis 16—16 generally defines the center line of the liquid bottle. The liquid bottle is in its upright position when the major axis is vertical and the top wall 410 is facing up. The extended curved neck 425 could be in the form of a letter "7" (as shown in FIG. 15-1), or in the form of a letter "Z", or "S" (as shown in FIGS. 15-2, 15-3). A mouth opening 430 at the end of the extended curved neck. a minor axis 17—17 perpendicular to the plan of the mouth opening. In general, the minor axis 17—17 is in parallel with the major axis 16—16. However, it is not necessary to do so, and the two axes may be intersected with a small angle. The extended curved neck 425 may start from almost anywhere of the liquid bottle 400 but usually starts from the top wall 410 or from the side wall at near the top wall and on the opposite side of the flat side wall 406. A passage way 435 along the center line of the extended curved neck connecting the mouth opening 430 with the inner chamber 420 of the liquid bottle 400.

After the liquid bottle is filled with liquid in the upright position. it can be laid flat on the side wall 406, the liquid inside the chamber 420 will not flow out even the liquid level line 445 inside the chamber 420 is higher than the liquid level line 450 at the mouth opening as long as it is oriented correctly with the "7", "Z" or "S" shaped curved neck in the upright position where the mouth opening end of the curved neck is on the upper most location when the liquid bottle is laid down flat before tilting as shown in FIG. 15 with angle A at zero degree. The bottom wall 415 is lifted further to pour the liquid. The liquid will not start to flow until the angle "A" reaches a pouring angle which can be anywhere between zero (0) to nearly ninety (90) degrees. This angle "A" is determined by the shape, size, curvature, and restrictions of the passage way 435.

The extended curved neck feature may be built-in with the liquid bottle (as shown in FIGS. 15-1, and 15-2) or built into a cap 455 and than attach the cap to any existing bottle with a gasket 460 for leak proofing (as shown in FIG. 15-3). Optional closing cap or plug 465 may be used to enclose the liquid bottle mouth opening when the bottle is not in use or during transportation.

Various modifications to the depicted and described apparatus will be apparent to those skilled in the art. Accordingly, the forgoing detailed description of the preferred embodiment should be considered exemplary in nature and not as limiting to the scope and spirit of the invention as set forth in the appended claims.

What is claimed is:

1. An apparatus for potting plants comprising:

a planter with side walls and a bottom to form a container, wherein the plant can be potted using potting medium; and a removable and external to the said planter, water reservoir/liquid bottle for storing water; and said water reservoir/liquid bottle is removed from the planter for refill each time when the water is exhausted; and said water reservoir/liquid bottle is turned upside down for insertion to the planter after refill; and an opening hole in the said planter provides means of insertion of a mouth opening for the said water reservoir/liquid bottle; and while inserted into the planter, a constant water level up to the mouth opening of the said water reservoir/liquid bottle is maintained inside the planter for as long as there is water inside the water reservoir/liquid bottle; and the water level surrounding the mouth opening of the water reservoir/liquid bottle stops the further release of water from the water reservoir/liquid bottle; and a bottom layer of the potting medium will be in contact with water in the bottom of the planter; and capillary action of the potting medium and suction from the plant roots will lift water to upper layers of the potting medium to support plant growth.

2. The apparatus of claim 1 further comprising:

an insert having wavy side walls projecting against the interior surfaces of the planter side walls; and the wavy side walls and the interior surfaces of the planter side walls form wavy air passageways to allow air flow; and the wavy side walls having multiple small holes or perforations to allow airflow through the wavy side walls between the potting medium and the wavy air passageways; and the natural transpiration of the plant allows the draw of ambient air into the wavy air passageways which passes through the small holes or perforations of the wavy side walls into the potting medium and finally completes a cycle by discharging back to the ambient through the top surface of the potting medium and through the plant leaves; and a maximized interface contact area between the potting medium and the wavy side walls enables the maximization of the circulation airflow without artificial enhancement with a circulation fan.

3. The apparatus of claim 1 further comprising:

an insert having wavy side walls projecting against the interior surfaces of the planter side walls; and the wavy side walls and the interior surfaces of the planter side walls form wavy air passageways to allow air flow; and the wavy side walls having multiple small holes or perforations to allow air flow through the wavy side walls between the potting medium and the wavy air passageways; and a circulation fan is installed at the bottom of the insert slightly above a water level line of the planter; and partition walls at the bottom of the insert provide ducting for air to flow from the wavy air passageways to a fan inlet; and exhaust ducting guides the discharge air back to the ambient; and the circulation fan is imbedded inside the potting medium for vibration and noise attenuation; and suction of the circulation fan pulls ambient air from the top surface of the potting medium through the plant root system which passes through the small holes or perforations of the wavy side walls into the wavy air passageways and to a suction end of the circulation fan and completes a cycle by discharging back to the ambient through discharge ducting; and a maximized interface contact area between the potting medium and the wavy side walls enables the circulation fan to have minimized resistance and maximized interface areas for air to flow through the potting medium therefore maximizing the effectiveness of the circulation fan.

4. The apparatus of claim 1 further comprising:

an insert having wavy side walls projecting against the interior surfaces of the planter side walls; and the wavy side walls and the interior surfaces of the planter side walls form wavy air passageways to allow air flow; and the wavy side walls have multiple small holes or perforations to allow air flow through the wavy side walls between the potting medium and the wavy air passageways; and partition walls at the bottom of the insert provide ducting for air to flow from the wavy air passageways to an exhaust duct extended from the bottom center of the planter straight up beyond the top of the potting medium and guides the discharge air back to the ambient; and a light bulb is situated at the top of the exhaust duct; and a transparent lamp shield surrounds the light bulb thereby forcing the exhaust air to pass through a restricted air space surrounding the light bulb; and the heating of the light bulb creates an uplifting suction of air and causes a partial vacuum in the wavy air passageways and therefore pulls ambient air from the top surface of the potting medium through the plant root system and passes through the small holes or perforations of the wavy side walls into the wavy air passageways; and before discharging to the ambient, air is being heated by the light bulb for sterilization; and a maximized interface contact area between the potting medium and the wavy side walls enables the air circulation flow through the potting medium to be maximized without artificial enhancement with a circulation fan.

5. The apparatus of claim 1 further comprising:

an insert having wavy side walls projecting against the interior surfaces of the planter side walls; and the wavy side walls and the interior surfaces of the planter side walls form wavy air passageways to allow air flow; and the wavy side walls have multiple small holes or perforations to allow air flow through the wavy side walls between the potting medium and the wavy air passageways; and a circulation fan is installed at the bottom of the insert slightly above a water level line of the planter; and partition walls at the bottom of the insert provide ducting for air to flow from the wavy air passageways to a fan inlet; and exhaust ducting from an exit end of the circulation fan guides the discharge air back to the ambient; and the circulation fan is imbedded inside the potting medium for vibration and noise attenuation; and a light bulb is situated at the top of the exhaust duct; and a transparent lamp shield surrounds the light bulb thereby forcing the exhaust air to pass through a restricted air space surrounding the light bulb; and suction of the circulation fan pulls air from the top surface of the potting medium through the plant root system which passes through the small holes or perforations of the wavy side walls into the wavy air passageways and to a suction end of the circulation fan and completes a cycle by discharging back to the ambient through discharge ducting; and before discharging to the ambient, air is being heated by the light bulb for sterilization; and a maximized interface contact area between the potting medium and the wavy side walls enables the circulation fan to have minimized resistance and maximized interface areas for air to flow through the potting medium therefore maximizing the effectiveness of the circulation fan.

6. An apparatus for potting plants comprising:

a planter with side walls and a bottom to form a container, wherein the plant can be potted using potting medium; and a removable and external to the said planter, water reservoir/liquid bottle for storing water; and said water reservoir/liquid bottle is removed from the planter for refill each time when the water is exhausted; and said water reservoir/liquid bottle is turned upside down for insertion to the planter after refill; and said removable water reservoir/liquid bottle prevents the spillage of water while the water reservoir/liquid bottle is turned upside down before insertion; and an opening hole in said planter provides arcuate means of insertion of a mouth opening for the said water reservoir/liquid bottle; and while inserted into the planter, a constant water level up to the mouth opening of the said water reservoir/liquid bottle is maintained inside the planter for as long as there is water inside the water reservoir/liquid bottle; and the water level surrounding the mouth opening of the water reservoir/liquid bottle stops the further release of water from the water reservoir/liquid bottle; and a bottom layer of the potting medium will be in contact with water in the bottom of the planter; and capillary action of the potting medium and suction from the plant roots will lift water to upper layers of the potting medium to support plant growth.

7. The apparatus of claim 6 further comprising:

an insert having wavy side walls projecting against the interior surfaces of the planter side walls; and the wavy side walls and the interior surfaces of the planter side walls form wavy air passageways to allow air flow; and the wavy side walls having multiple small holes or perforations to allow airflow through the wavy side walls between the potting medium and the wavy air passageways; and the natural transpiration of the plant allows the draw of ambient air into the wavy air passageways which passes through the small holes or perforations of the wavy side walls into the potting medium and finally completes a cycle by discharging back to the ambient through the top surface of the potting medium and through the plant leaves; and a maximized interface contact area between the potting medium and the wavy side walls enables the maximization of the circulation airflow without artificial enhancement with a circulation fan.

8. The apparatus of claim 6 further comprising:

an insert having wavy side walls projecting against the interior surfaces of the planter side walls; and the wavy side walls and the interior surfaces of the planter side walls form wavy air passageways to allow air flow; and the wavy side walls having multiple small holes or perforations to allow air flow through the wavy side walls between the potting medium and the wavy air passageways; and a circulation fan; and partition walls at the bottom of the insert provide ducting for air to flow from the wavy air passageways to a fan inlet; and exhaust ducting guides the discharge air back to the ambient; and suction of the circulation fan pulls ambient air from the top surface of the potting medium through the plant root system which passes through the small holes or perforations of the wavy side walls into the wavy air passageways and to a suction end of the circulation fan and completes a cycle by discharging back to the ambient through discharge ducting; and a maximized interface contact area between the potting medium and the wavy side walls enables the circulation fan to have minimized resistance and maximized interface areas for air to flow through the potting medium therefore maximizing the effectiveness of the circulation fan.

9. The apparatus of claim 6 further comprising:

an insert having wavy side walls projecting against the interior surfaces of the planter side walls; and the wavy side walls and the interior surfaces of the planter side walls form wavy air passageways to allow air flow; and the wavy side walls have multiple small holes or perforations to allow air flow through the wavy side walls between the potting medium and the wavy air passageways; and partition walls at the bottom of the insert provide ducting for air to flow from the wavy air passageways to an exhaust duct extended from the bottom center of the planter straight up beyond the top of the potting medium and guides the discharge air back to the ambient; and a light bulb is situated at the top of the exhaust duct; and a transparent lamp shield surrounds the light bulb thereby forcing the exhaust air to pass through a restricted air space surrounding the light bulb; and the heating of the light bulb creates an uplifting suction of air and causes a partial vacuum in the wavy air passageways and therefore pulls ambient air from the top surface of the potting medium through the plant root system and passes through the small holes or perforations of the wavy side walls into the wavy air passageways; and before discharging to the ambient, air is being heated by the light bulb for sterilization; and a maximized interface contact area between the potting medium and the wavy side walls enables the air circulation flow through the potting medium to be maximized without artificial enhancement with a circulation fan.

10. The apparatus of claim 6 further comprising:

an insert having wavy side walls projecting against the interior surfaces of the planter side walls; and the wavy side walls and the interior surfaces of the planter side walls form wavy air passageways to allow air flow; and the wavy side walls have multiple small holes or perforations to allow air flow through the wavy side walls between the potting medium and the wavy air passageways; and a circulation fan; and partition walls at the bottom of the insert provide ducting for air to flow from the wavy air passageways to a fan inlet; and exhaust ducting from an exit end of the circulation fan guides the discharge air back to the ambient; and a light bulb is situated at the top of the exhaust duct; and a transparent lamp shield surrounds the light bulb thereby forcing the exhaust air to pass through a restricted air space surrounding the light bulb; and suction of the circulation fan pulls air from the top surface of the potting medium through the plant root system which passes through the small holes or perforations of the wavy side walls into the wavy air passageways and to a suction end of the circulation fan and completes a cycle by discharging back to the ambient through discharge ducting; and before discharging to the ambient, air is being heated by the light bulb for sterilization; and a maximized interface contact area between the potting medium and the wavy side walls enables the circulation fan to have minimized resistance and maximized interface areas for air to flow through the potting medium therefore maximizing the effectiveness of the circulation fan.

11. The apparatus of claim 6 wherein the removable external water reservoir/liquid bottle further comprises:

a container for the storage of liquid with a major axis along the center line of the container; and an extended curved neck near a top end of the container; and a curved passageway along a center line of the said extended curved neck with a mouth opening communicating the interior of the water reservoir/liquid bottle with the ambient; and said curved passageway has the basic form of a number seven "7" with deviations to include the forms of the letters "Z" and "S"; and said mouth opening is located at a terminating end of an upper portion of the curved neck having the form of the number seven "7" or letters "Z" or "S"; and after filling the water reservoir/liquid bottle with liquid, the water reservoir/liquid bottle may be laid down with a bottom end of the water reservoir/liquid bottle being higher than the top end of the water reservoir/liquid bottle without spilling liquid as long as the "7" or "Z" or "S" shaped curved neck is positioned such that the curved neck having the form of the "7" or "Z" or "S" is oriented in the upright direction when the water reservoir/liquid bottle is laid down (the major axis being in the substantially horizontal direction) and the mouth opening of the curved neck having the form of "7" or "Z" or "S" is on the upper most position; and size, shape and curvature of the curved passageway determines a starting angle where a liquid inside the water reservoir/liquid bottle will begin to flow out from the water reservoir/liquid bottle.

* * * * *